(12) United States Patent
Williams

(10) Patent No.: US 8,293,116 B2
(45) Date of Patent: Oct. 23, 2012

(54) LIQUID ACCELERATOR APPARATUS

(76) Inventor: Joseph Williams, Fairborn, OH (US)

( * ) Notice: Subject to any disclaimer, the term of this patent is extended or adjusted under 35 U.S.C. 154(b) by 0 days.

(21) Appl. No.: 13/048,275

(22) Filed: Mar. 15, 2011

(65) Prior Publication Data

US 2011/0226707 A1    Sep. 22, 2011

Related U.S. Application Data

(60) Provisional application No. 61/340,503, filed on Mar. 18, 2010.

(51) Int. Cl.
*B01D 37/00* (2006.01)
*C02F 1/28* (2006.01)

(52) U.S. Cl. ........ 210/681; 210/691; 210/767; 210/787; 210/282; 210/289; 210/456; 210/502.1; 210/503; 210/908; 210/497.3

(58) Field of Classification Search .................... None
See application file for complete search history.

(56) References Cited

U.S. PATENT DOCUMENTS

| | | | | | |
|---|---|---|---|---|---|
| 2,302,116 | A | * | 11/1942 | Gill | 210/131 |
| 2,313,896 | A | * | 3/1943 | Scheble | 210/167.02 |
| 2,332,982 | A | * | 10/1943 | Blair | 210/411 |
| 2,725,986 | A | * | 12/1955 | Marvel | 210/315 |
| 3,546,854 | A | * | 12/1970 | Muller | 55/455 |
| 3,931,011 | A | * | 1/1976 | Richards et al. | 210/136 |
| 4,036,616 | A | * | 7/1977 | Byrns | 55/498 |
| 4,215,688 | A | * | 8/1980 | Terman et al. | 604/6.04 |
| 4,303,530 | A | * | 12/1981 | Shah et al. | 210/651 |
| 4,312,751 | A | * | 1/1982 | Casamitjana | 210/94 |
| 4,406,788 | A | * | 9/1983 | Meadus et al. | 210/512.1 |
| 4,411,783 | A | * | 10/1983 | Dickens et al. | 210/304 |
| 4,549,961 | A | * | 10/1985 | Bellemann et al. | 210/108 |
| 4,601,824 | A | * | 7/1986 | Dreyer | 210/232 |
| RE32,711 | E | * | 7/1988 | Dickens et al. | 210/304 |
| 4,885,089 | A | * | 12/1989 | Hankammer | 210/420 |
| 4,919,802 | A | * | 4/1990 | Katsura | 422/44 |
| 4,964,984 | A | * | 10/1990 | Reeder et al. | 210/188 |
| 5,035,236 | A | * | 7/1991 | Kanegaonkar | 128/201.13 |
| 5,454,945 | A | * | 10/1995 | Spearman | 210/315 |
| 5,632,894 | A | * | 5/1997 | White et al. | 210/436 |
| 5,750,024 | A | * | 5/1998 | Spearman | 210/315 |
| 5,910,247 | A | * | 6/1999 | Outterside | 210/487 |
| 6,415,788 | B1 | * | 7/2002 | Clawson et al. | 128/201.13 |
| 6,482,451 | B1 | * | 11/2002 | Baron | 426/85 |
| 6,719,900 | B2 | * | 4/2004 | Hawkins | 210/248 |
| 7,232,035 | B1 | * | 6/2007 | Crawford et al. | 210/456 |
| 7,517,393 | B2 | * | 4/2009 | Richard | 95/280 |
| 7,572,310 | B2 | * | 8/2009 | Gieseke et al. | 55/498 |
| 7,981,187 | B2 | * | 7/2011 | Gieseke et al. | 55/498 |
| 2003/0006187 | A1 | * | 1/2003 | Frey | 210/497.01 |
| 2003/0183587 | A1 | * | 10/2003 | Hawkins | 210/787 |
| 2007/0175328 | A1 | * | 8/2007 | Richard | 95/280 |
| 2008/0083378 | A1 | * | 4/2008 | Pearce | 119/707 |
| 2009/0100813 | A1 | * | 4/2009 | Iddings et al. | 55/489 |
| 2009/0283016 | A1 | * | 11/2009 | Mohamed et al. | 106/638 |
| 2011/0226707 | A1 | * | 9/2011 | Williams | 210/807 |

* cited by examiner

*Primary Examiner* — Robert James Popovics
(74) *Attorney, Agent, or Firm* — John Dodds

(57) ABSTRACT

An apparatus and a method is disclosed to filter liquids, such as water, waste water, agricultural liquids or other industrial liquids. The apparatus and the method rely on a novel technology where an acceleration apparatus facilitates generating energy that fractures the bonds between organic and inorganic particles and water molecules to allow a media to collect the organic and inorganic particles.

4 Claims, 1 Drawing Sheet

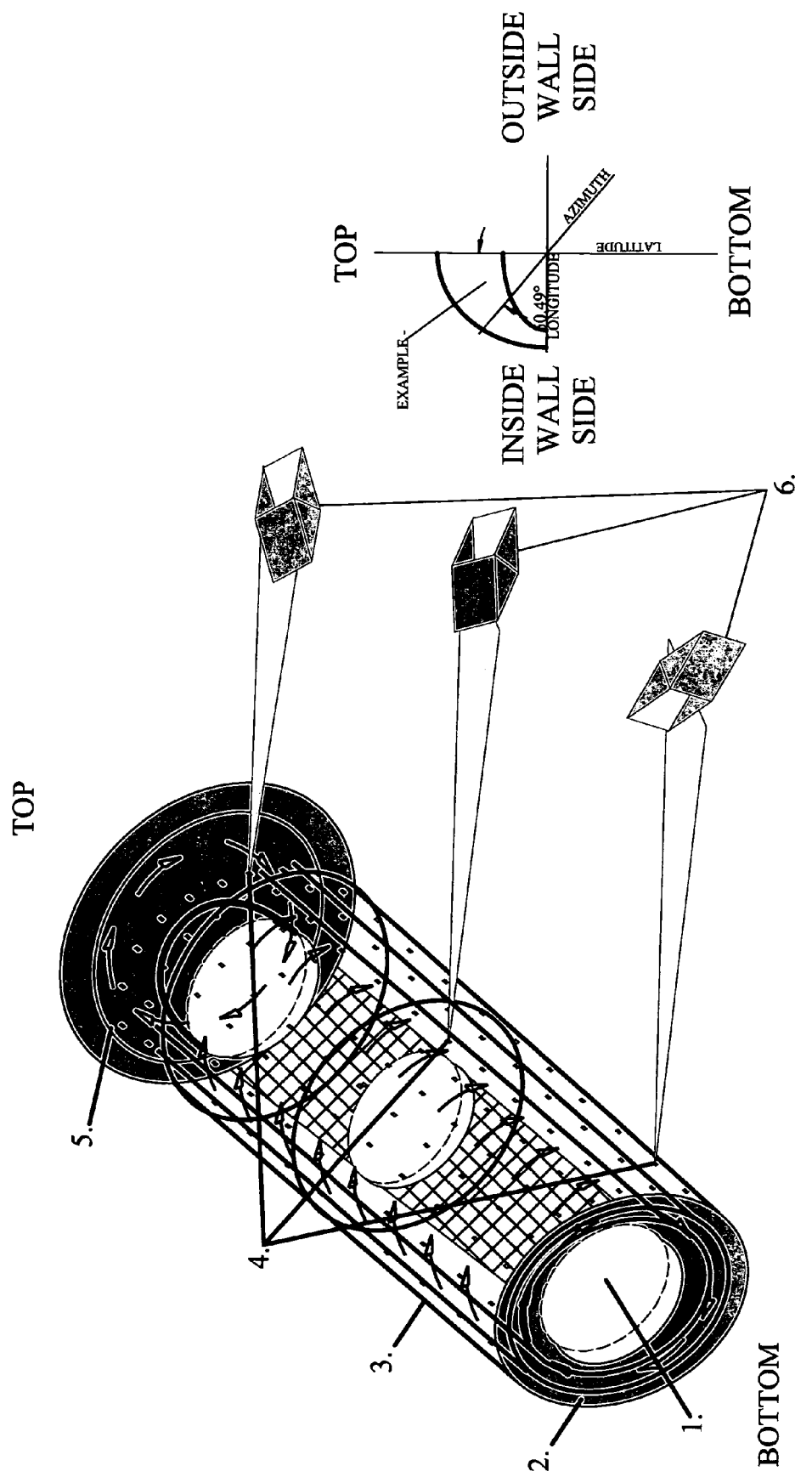

LIQUID ACCELERATOR APPARATUS

PRIORITY

This application claims priority of U.S. provisional application 61/340,503 filed on Mar. 18, 2010.

FIELD OF THE INVENTION

This invention relates to the field of water management. More specifically the invention relates to water recycling, desalination, filtration and purification.

BACKGROUND OF THE INVENTION

This invention relates in general to filtration of liquids, such as water, wastewater, and other industrial or agricultural liquids.

Developers and vendors of water control technologies face a sudden ramp-up in opportunities as multiple new segments and regional markets open up with vast untapped needs. Water supply, quality and reuse/recycling are turning into the biggest challenges of the 21st century. Innovations in technologies and services are urgently required to track, manage, treat and desalinate water and wastewater. Markets range from oil and gas extraction, power generation (fossil and renewable, including biofuels), food/beverage, desalination, mining, commercial real estate and corporate risk management. The US EPA forecasts $277 billion will need to be spent on water infrastructure by 2019, while some market analysts put the tag as high as $600 billion.

With so many markets growing and evolving, each segment has its own unique needs. By today there are various solutions provided for water purification and filtration. Reverse osmosis, granulated, activated charcoal, ion exchange resins, electro coagulation systems are applications that can be used for water purification and filtration.

SUMMARY OF THE INVENTION

This disclosure provides a novel solution to the present increased needs in the field of water recycling, purification, desalination and filtration.

This disclosure provides a novel technology and apparatus that facilitates generating energy that fractures the bonds between organic and inorganic particles and water molecules to allow a media to collect the organic and inorganic particles. The composition of the media is selected based on the fluid to be filtrated and particles to be collected.

The acceleration apparatus comprises a reactor, a cylindrical housing forming an exterior wall, an end plate and a top locking cone. The reactor has an interior wall that has specific lancing. A water outlet tube fits in the core of the acceleration apparatus, extending from the bottom of the apparatus (end plate) to within inches of the top of the interior wall and the top-locking cone. The top locking cone locates on top of the reactor and the head of the cone defines water inlet allowing the water to enter into the space between the interior wall of the reactor and the exterior wall.

According to this disclosure, the media is poured into the area between the interior wall of the reactor and the outlet tube. Organic and inorganic particles are collected by the media and the media also increases the particles release from the water bonds. Accordingly, the apparatus of this invention facilitates collection of organic and inorganic particles from water or other liquid and the apparatus enhances release of particles from the water bonds due to the specific characteristics of the apparatus. An important functional feature of the apparatus is lancing of the interior wall of the reactor. The lancing allows the liquid to increase pressure between the exterior wall, interior wall and the outlet tube. The lancing on the interior wall is at a specific angle to the interior area (space between water outlet tube and interior wall) where the media is placed. This angle creates the liquid spinning at a high accelerated rate. The angle is critical and the lancing opening is very critical to ensure the reaction in the media area is maintained. According to a preferred embodiment, the lancing angle is divided into three areas on the interior wall. In the lower area of the interior wall lancing is 110-120 degrees from centerline. This allows the lower media area to rise into the increased velocity area in the center section of the closed concentric space. The middle portion is 90 degrees from centerline and the top area of the inner wall is 45 degrees from centerline of the lancing stack.

BRIEF DESCRIPTION OF THE DRAWINGS

FIG. 1. Illustrates the acceleration apparatus. The apparatus has a cylinder forming an exterior wall (1) and a closed concentric acceleration and recirculation chamber (2) formed between an interior wall (3) and an outlet tube (4). The outlet tube fits in the core of the apparatus extending from the bottom end plate (5) to inches from the top of the interior wall and the top locking cone (6). Media is poured in the area limited by the interior wall and water outlet tube. Water or liquid to be filtered is led into the space between the interior and the exterior walls through water inlet (7) defined by the cone locating on top of the reactor. The interior wall has specific lancing (8) where the angle of the openings, as defined hereinabove, creates water acceleration between the interior and the outlet tube. The arrows illustrate the movement direction of the liquid in the system.

DETAILED DESCRIPTION OF THE INVENTION

A description of the invention and detailed illustrative embodiments of the present invention are disclosed herein. A person skilled in the art would realize that various alterations could be made without deviating from the spirit of the invention.

Definitions: In connection with this disclosure, liquid means an aqueous liquid. Such aqueous liquid may for example be wastewater, drinking water, saline water, industrial or agricultural liquids. The term 'liquid' means any aqueous liquid that is intended to be purified, filtrated, desalinated, recycled.

The technology according to this disclosure has several unique features that will change how water/waste filtration is implemented.

The technology according to this disclosure is compatible for the acceleration recirculating apparatus technology that is part of every filtration cylinder. This technology facilitates generating energy that fractures the bonds between the organic and inorganic particles and water molecules to allow the media to collect the organic and inorganic particles. The media can be selected depending on the character of the fluid to be filtrated and the particles to be collected. Examples of useful media are diatomaceous earth (D.E.), zeolite, sulfur, and a macroporous strong base ion exchange resin imparting nitrate ion removal, but other media components well known to those skilled in the art may also be used.

The water or liquid entry point for each apparatus is specifically designed to initiate the acceleration of the water fracturing process. Even though the inlet (7) can be adjusted from ½ inch to an opening of 12 inches, the internal reactor is the key for fracturing the bonds. The liquid rotation speed with the interaction of the media to the accelerated liquid rotation causes water molecule bonds to breakdown and increase the amount of organic and inorganic particle collection in the media and maintains the particle release to be captured in the final stage of the filtration system. The water or liquid passes through the inner wall lances (8) into the closed concentric acceleration and recirculation chamber (2). The closed concentric chamber holds the media where the water/liquid collides with the media at tremendous acceleration. The media tumbles around in the concentric chamber (2). The outlet tube (4) has outlet holes or openings in its wall for water to enter the outlet tube but the outlet tube is covered with a material (e.g. membrane) to retain the media in the reactor area. The acceleration reactor is housed inside a cylindrical material to manage the specific acceleration of the liquid and to ensure specific contact with the media material. The housing cylinder surrounds a compact, efficient reactor for accelerating and recirculating fluid through a closed concentric space. The reactor fits in the internal chamber of the filtration cylinder to change liquid from flowing through a cylinder to creating a reaction inside a cylinder. The liquid starts to accelerate inside the cylinder through a specific orifice and travels out the apparatus by multiple openings design to increase the acceleration of the liquid.

The reaction created in a cylinder is intense flow movement in a specific pattern defined by the accelerator apparatus. This movement is defined by the specific characteristic engineered into the apparatus. These characteristics include multiple non-intersecting openings in the interior wall of the reactor parallel to the general flow direction of the liquid stream to provide a reaction with variable pressure and adequate mass transfer of the liquid through the media. The openings are specifically placed in a pattern that intensifies the acceleration inside the concentric space. According to a preferred embodiment, the lancing angle is divided into three areas on the interior wall. In the lower area of the interior wall lancing is 110-120 degrees from centerline. This allows the lower media area to rise into the increased velocity area in the center section of the closed concentric space. The middle portion is 90 degrees from centerline and the top area of the inner wall is 45 degrees from centerline of the lancing stack.

The concentric space provides the specific amount of area that retains the media material and uniquely allows for the liquid to be recirculated multiple times in a manner that ensures fracturing of the molecules and release of the organic and inorganic material.

The interior of the filtration cylinder can be 12, 10, 8, 6, 4 or 3 inches in diameter with a minimum length of the cylinder to be 21 inches. The inlet and outlet of each cylinder can range from ½ to 12 inches in diameter. The acceleration reactor fits inside the cylinder and is sealed between both ends of the cylinder end bushings.

The water outlet fits in the core of the acceleration apparatus extending from the bottom of the apparatus to within inches of the top of the interior wall and the top-locking cone. The cone encloses the closed concentric space (space between the inner wall and the water outlet tube) that ensures the correct reaction takes place between the organic and/or inorganic particles and water molecules.

The bottom of the acceleration apparatus rests on the outlet bushing that seals the lower portion of the cylinder. The top of the acceleration apparatus exterior seals the internal wall of the cylinder and the inlet water bushing.

The inner wall of the acceleration apparatus attaches to the lower plate that seals the apparatus outer wall with the apparatus inner wall. The apparatus inner wall is approximately 75% in length to the outer wall.

The inner wall is sealed at the top with a cone like cap with grooves that produce the initial rotation of the water into the reactor. This cone like cap is secured to the inner wall for operational use and is easily removed for installation and removal of media material. The cap also allows for inspection of the media, media retainer sleeve and position/retainer sleeve devices. In addition, inspection of the acceleration and recirculating space provides details of proper water motion in the closed concentric space.

The interaction of the liquid and media material in a recirculation pattern allows for media material and water molecules to interact repeatedly before exiting the confined water passage area through the outlet holes into the outlet tube. The confined space, reaction between the media and the liquid allows the media to collect the extremely fine organic and inorganic particles in the media. The acceleration apparatus is the key to the separation of organic and/or inorganic material and water molecules. This apparatus produces the energy required to create the fracturing of bonds between organic and/or inorganic material and water molecules. This key component produces the appropriate energy to release the bonds between the organic and inorganic material and water molecules.

It is well known that some molecule bonds are stronger than others. The apparatus according to this disclosure produces enough energy to induce up to 100% of specific chemical release and collection in the media. This technology also provides the means to remove 32% of sodium chloride in fractured water from crude oil/natural gas recovery through a single pass on a micro filtration system. This system is designed to process water/wastewater under current pump pressures (e.g. if a pump and plumbing system can move 170,000 gallons per day this technology can process 170,000 gallons per day). The acceleration apparatus design of this disclosure has the ability to be manufactured to process 1,000 to 500,000 gallons per day per filtration system. A 1,000-gallon system only requires 2 cylinders, each with the acceleration apparatus. Since the filtration system is modular in designed a filtration system will have multiple modules to accommodate 500,000 gallons per day.

What is claimed is:

1. A method to filter liquid, said method comprising the steps of:
   a) letting liquid into a liquid accelerator apparatus through an inlet, said inlet being defined by a grooved cone, said grooved cone initiating rotating movement of the liquid;
   b) allowing the rotating liquid into a space between an exterior wall and an interior wall of the accelerator;
   c) creating acceleration of the rotating movement of the liquid by allowing the liquid enter countless times in and out through openings locating on the interior wall of the accelerator, thereby causing fracturing of water molecules and release of organic and inorganic material;
   d) allowing the liquid to interact with a medium located between the interior wall of the accelerator and a water outlet tube, whereby the organic and inorganic material released from the liquid is collected by the medium;
   e) letting purified liquid enter a liquid outlet tube locating in core of the apparatus; and
   f) receiving liquid purified from the organic and inorganic material;
      wherein said interior wall recited in (b) is comprised of three areas:
         (1) a lower area wherein lancing is 110-120 degrees from centerline allowing the lower media area to rise into the increased velocity area in the center section of the closed concentric space;

(2) a middle portion wherein lancing is 90 degrees from centerline, and;

(3) a top area of the inner wall wherein lancing is 45 degrees from centerline of the lancing stack.

2. The method of claim 1, wherein the media is selected from the group consisting of diatomaceous earth, zeolite, sulfur, and a macroporous strong base ion exchange resin imparting nitrate ion removal.

3. The method of claim 1, wherein the liquid is selected from a group consisting of water, saline water, waste water, agricultural liquid or industrial liquid.

4. The method of claim 1 wherein said liquid is water.

* * * * *